United States Patent
Severinsson

(10) Patent No.: US 9,797,459 B2
(45) Date of Patent: Oct. 24, 2017

(54) HYDRAULIC SYSTEM WITH A DOG CLUTCH

(71) Applicant: BorgWarner TorqTransfer Systems AB, Landskrona (SE)

(72) Inventor: Lars Severinsson, Hishult (SE)

(73) Assignee: BorgWarner Sweden AB, Landskrona (SE)

( * ) Notice: Subject to any disclaimer, the term of this patent is extended or adjusted under 35 U.S.C. 154(b) by 83 days.

(21) Appl. No.: 14/782,068

(22) PCT Filed: Mar. 26, 2014

(86) PCT No.: PCT/EP2014/056022
§ 371 (c)(1),
(2) Date: Oct. 2, 2015

(87) PCT Pub. No.: WO2014/161751
PCT Pub. Date: Oct. 9, 2014

(65) Prior Publication Data
US 2016/0053825 A1    Feb. 25, 2016

(30) Foreign Application Priority Data
Apr. 3, 2013 (SE) ........................... 1350415

(51) Int. Cl.
*F16D 25/061* (2006.01)
*F16D 48/02* (2006.01)

(52) U.S. Cl.
CPC ............ *F16D 25/061* (2013.01); *F16D 25/14* (2013.01); *F16D 48/02* (2013.01);
(Continued)

(58) Field of Classification Search
CPC ..................................................... F16D 25/061
See application file for complete search history.

(56) References Cited

U.S. PATENT DOCUMENTS

| | | | |
|---|---|---|---|
| 6,296,097 B1 * | 10/2001 | Hunt | B60K 17/34 |
| | | | 192/69.9 |
| 2009/0032360 A1 | 2/2009 | Asano | |
| 2010/0274456 A1 | 10/2010 | Kondo et al. | |

FOREIGN PATENT DOCUMENTS

| | | |
|---|---|---|
| CN | 201082676 Y | 7/2008 |
| CN | 102563047 A | 7/2012 |

(Continued)

OTHER PUBLICATIONS

Chinese Office Action dated Mar. 1, 2017 ; Application No. 201480019272.4; Applicant: BorgWarner TorqTransfer Systems AB.; 6 pages.

*Primary Examiner* — Jacob S Scott
*Assistant Examiner* — Timothy M Hannon
(74) *Attorney, Agent, or Firm* — BrooksGroup

(57) ABSTRACT

In a hydraulic system with a dog clutch (23-25), a hydraulically operated dog clutch actuator is arranged to alternatively bring the dog clutch into a connect mode or a disconnect mode. The clutch actuator has a piston (27) reciprocally movable under hydraulic pressure between two end positions, corresponding to the two clutch modes. Pressurized hydraulic oil is supplied to the clutch actuator by a hydraulic power system comprising a pump (4) driven by an electric motor (3). Means are provided in the clutch actuator to decrease the hydraulic pressure acting on the piston (27) at the approaching by the piston of either of its end positions, so that a hydraulic signal is transmitted back to the hydraulic power system.

7 Claims, 5 Drawing Sheets

(52) U.S. Cl.
CPC ........... *F16D 2048/0212* (2013.01); *F16D 2048/0242* (2013.01); *F16D 2048/0263* (2013.01); *F16D 2048/0284* (2013.01); *F16D 2500/1024* (2013.01); *F16D 2500/10462* (2013.01)

(56) References Cited

FOREIGN PATENT DOCUMENTS

| | | |
|---|---|---|
| DE | 10126485 A1 | 12/2002 |
| DE | 102009019811 A1 | 11/2010 |
| JP | 2004074928 A | 3/2004 |
| JP | 2010126121 A | 6/2010 |
| WO | 2011043722 A1 | 4/2011 |
| WO | 2012125096 A1 | 9/2012 |

\* cited by examiner

HYDRAULIC SYSTEM WITH A DOG CLUTCH

This application claims the benefit of Swedish Application No. 1350415-4 filed Apr. 03, 2013 and PCT Application No. EP2014/056022 filed Mar. 26, 2014.

TECHNICAL FIELD

The present invention relates to a hydraulic system with a dog clutch, wherein a hydraulically operated dog clutch actuator is arranged to alternatively bring the dog clutch into a connect mode or a disconnect mode, the clutch actuator has a piston reciprocally movable under hydraulic pressure between two end positions, corresponding to the two clutch modes, pressurized hydraulic oil is supplied to the clutch actuator by a hydraulic power system comprising a pump driven by an electric motor.

BACKGROUND OF THE INVENTION

As is well known in the art, an AWD (All Wheel Drive) vehicle can be provided with at least one hydraulic disc coupling for distributing the driving torque from the vehicle engine to all of the vehicle wheels. Especially, such a coupling may be provided in the drive line between the front axle and the wheels of the rear axle, most often in the vicinity of the rear axle differential.

Sometimes, it may be desirable to use the AWD vehicle in a FWD (Forward Wheel Drive) mode. In this case the coupling is disconnected, i.e. its discs are separated from each other.

By operating the vehicle with the coupling in a disconnect mode, rotating masses in the vehicle are reduced, leading to a lower fuel consumption.

In a practical case a propeller shaft of the vehicle, possibly including one or two bevel gear transmissions, has a hydraulic disc coupling at one end and a simple connect/disconnect clutch, for example a dog clutch, at the other end. In the disconnect mode both these couplings must be disconnected for obtaining the desired effect.

The present invention relates to a hydraulic system with a dog clutch, having a hydraulically operated dog clutch actuator as set out above.

A pump actuator system for an AWD hydraulic disc coupling is disclosed in WO 2011/043722 . In such a system the supply of hydraulic oil to the coupling piston is governed by the rotative speed of a pump. A similar system may be utilized for the operation of the dog clutch actuator.

It is of great importance that the disconnect/connect function is performed properly, so that the respective mode is reached as desired. There is thus a need to obtain a check in the form of a confirmation signal that the respective mode has been reached.

THE INVENTION

This is according to the invention accomplished in that means are provided in the clutch actuator to decrease the hydraulic pressure acting on the piston at the approaching by the piston of either of its end positions, so that a hydraulic signal is transmitted back to the hydraulic power system.

This hydraulic pressure decrease leads to a decreased current level to the motor in the hydraulic system.

The design of the clutch actuator is preferably such that the piston together with its cylinder sleeve forms two working compartments each with an inlet port and that the piston is provided with two overflow holes each being arranged to get in contact with one of the working compartments, when the piston is in or close to one of its end positions.

The clutch actuator is preferably arranged near the dog clutch coaxially around an axle to the dog clutch with the tubular piston surrounding the axle.

The working compartments may be formed by the piston, the cylinder, a central sealing on the piston and two internal sealings in the cylinder sleeve, the latter sealings being positioned close to and axially outside of the inlet ports.

Preferably, the piston is connected to a clutch ring of the dog clutch by means of longitudinal operating strips in axial grooves in the axle.

A resilient positioning device may be attached to the piston and have resilient means for positioning engagement with either of two circumferential grooves in the axle. Hereby the piston will be positively held in either of its two end position. Also, the engagement between the resilient means and the respective groove can exert a force on the piston to assume its proper end position, so that the desired signal is transmitted.

BRIEF DESCRIPTION OF THE DRAWINGS

The invention will be described in further detail below under reference to the accompanying drawings, in which.

DETAILED DESCRIPTION

A drive system of an AWD (All Wheel Drive) vehicle is well known in the art. Typical examples are shown in WO 2011/043722 . Such a system has an engine, a front axle with a differential, an intermediate shaft or cardan shaft, and a rear axle with a differential. In order to distribute the torque not only to the front axle but also to the rear axle in accordance with the driving conditions, an electronically controlled wet disc coupling is arranged in the driveline to the rear axle, often in the intermediate shaft or otherwise close to the rear differential. This wet disc coupling is for example described in WO 2012/125096.

Figure 1:
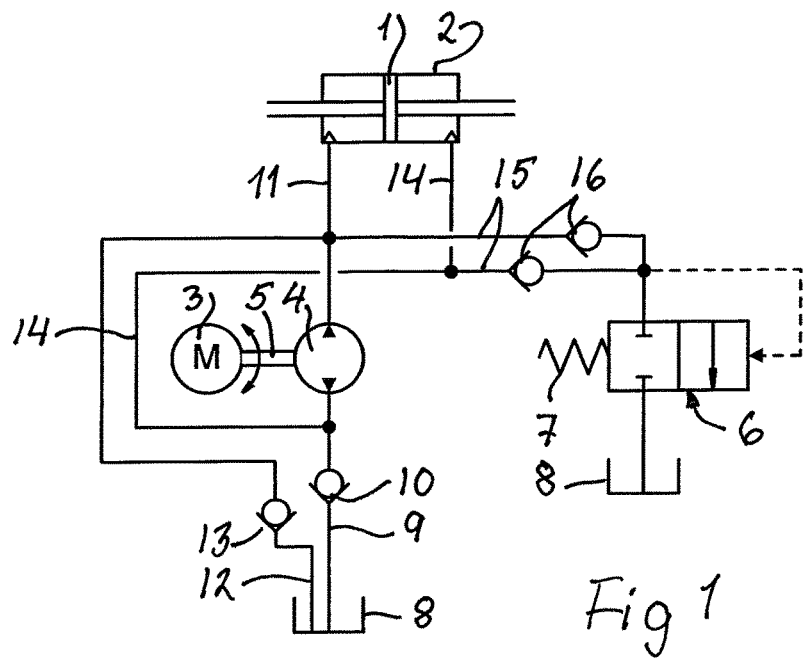
FIG. 1 shows a hydraulic scheme for a clutch according to the invention.
Figure 2:
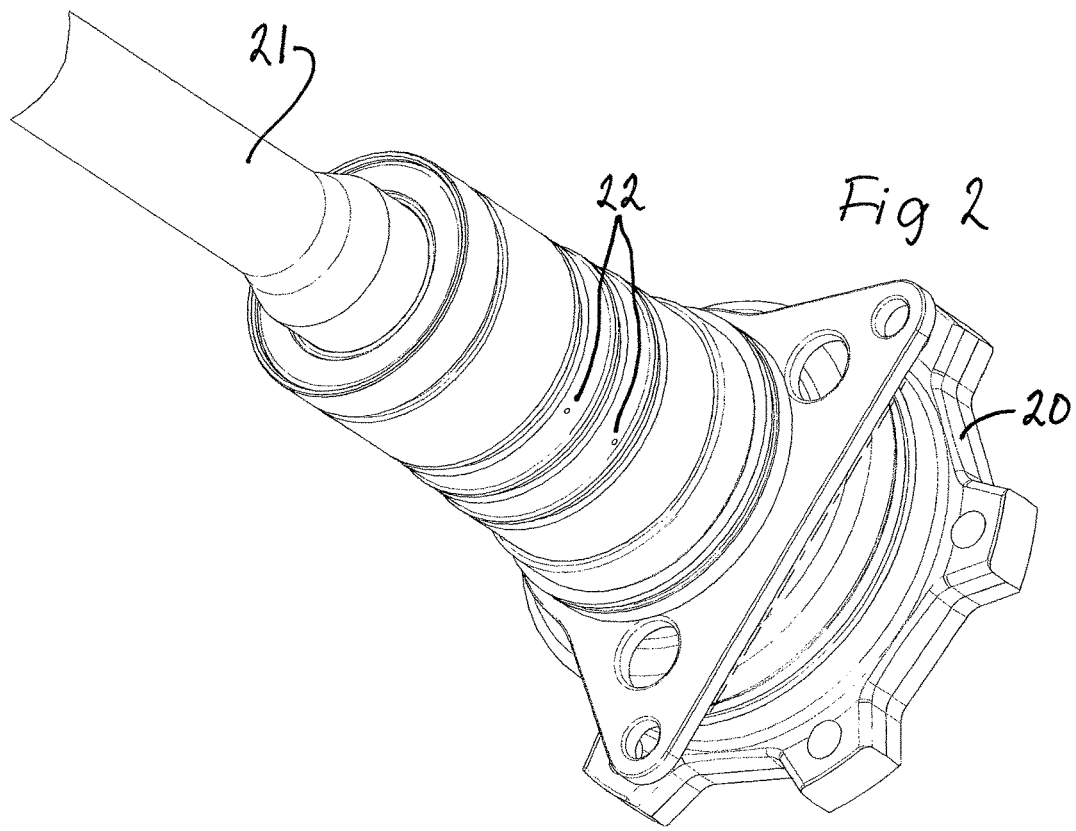
FIG. 2 is an isometric view of a clutch and a clutch actuator according to the invention (without a clutch actuator housing)

Only as possible examples two embodiments of rear axle architectures for an AWD vehicle are shown in FIGS. 1 and 2 thereof.

The function of the coupling when driving the vehicle in an AWD mode is described elsewhere, for example in the mentioned WO 2011/043722.

When it is desired to drive the AWD vehicle in an FWD (Forward Wheel Drive) mode, the disc coupling is disconnected, i.e. its discs are separated for preventing them from transmitting any torque. The coupling may be said to be in a disconnect mode. For enhancing this separation effect, the oil normally provided in the coupling for lubricating and cooling its discs can be removed from the coupling. In order to reduce the acceleration of the rotating mass of the intermediate propelling shaft and to eliminate the drag torque in bearings and sealings therefor, a clutch, preferably close to the front axle differential, may be provided to bring the intermediate shaft 1 to a standstill in FWD mode of the vehicle.

The present invention is concerned with such a clutch, which is a hydraulically controlled connect/disconnect dog clutch.

FIG. 1 shows a hydraulic scheme for controlling the clutch according to the invention.

The clutch is actuated by means of a piston 1 received in a cylinder 2. The piston 1 will move to the left or right in the drawing depending on the hydraulic pressure applied to either side of the piston.

An electric motor 3 drives a pump 4 via a drive shaft 5. A pressure overflow valve 6 is controlled by a hydraulic pressure in the system and by a spring 7.

The motor 3 can be supplied with positive or negative current for rotation in either direction. Depending on the rotation direction—also of the pump 4—hydraulic oil under pressure will be supplied to either side of the piston 1 by the hydraulic system, now to be described.

Hydraulic oil for the hydraulic actuator system is contained in a reservoir 8. If the motor 3 is rotated in a first direction, oil is sucked into the pump 4 through a hydraulic line 9, provided with a one-way valve 10, and is delivered therefrom towards the left side of the piston 1 through a hydraulic line 11. If the motor 3 is rotated in a second direction, oil is sucked into the pump 4 through a hydraulic line 12, provided with a one-way valve 13, and is delivered therefrom towards the right side of the piston 1 through a hydraulic line 14.

Depending on the balance between the force of the spring 7 and the hydraulic pressure acting on the pressure overflow valve 6, hydraulic flow for either side of the piston 1 is diverted through hydraulic lines 15—provided with one-way valves 16—through the overflow valve 6 and back to the reservoir 8. The result is that the hydraulic pressure delivered to the cylinder 2 is governed by the spring 7.

FIG. 2 is an isometric view of a clutch and a clutch actuator according to the invention. The clutch is arranged between a flange arrangement 20 to be connected to a driving member of the vehicle, in which the clutch is to be arranged, and an axle 21. The purpose of the clutch is to distinctly connect or disconnect the two members 20 and 21 to and from each other, respectively. The clutch actuator is lacking its housing in FIG. 2, which means that oil delivery holes 22 are visible.

Figure 3:
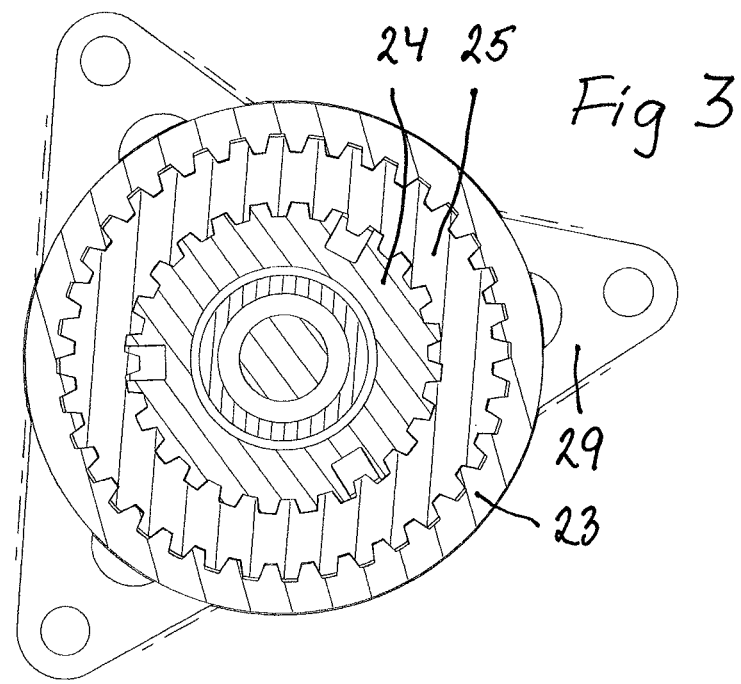
FIGS. 3 and 4 are sectional views from the left in FIGS. 5-8 of the clutch in connect and disconnect mode, respectively.
Figure 4:
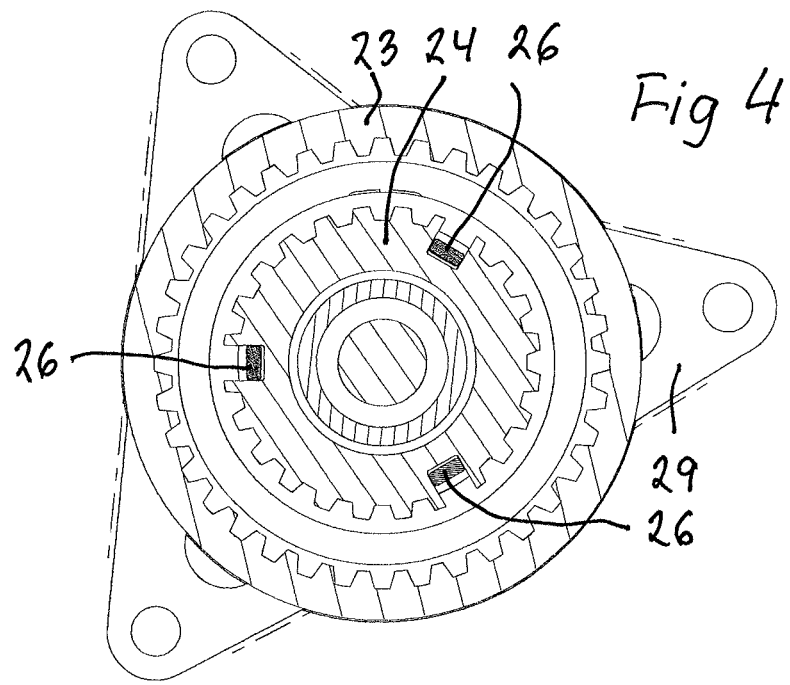

FIGS. 3 and 4 are sectional views through the mechanical dog clutch itself in connect mode and disconnect mode, respectively. The main portions of the dog clutch are an outer ring 23 in the flange arrangement 21, an inner ring 24 on the axle 21, and a clutch ring 25 between the two other rings 23, 24. As illustrated, the rings are provided with meshing teeth.

In FIG. 3 the clutch ring 25 is arranged between the two rings 23, 24, so that the axle 21 is connected to the flange arrangement 20, whereas in FIG. 4 the clutch ring 25 (not visible in FIG. 4) has been brought out of engagement with the two rings 23, 24, so that the axle 21 is disconnected from the flange arrangement 20.

The mechanical and hydraulic actuation or operation of the dog clutch will now be described with special reference to FIGS. 5-10. For the sake of clarity, reference numerals are only provided in these figures to the extent necessary for a proper understanding of what the respective figure is illustrating.

Figure 6:
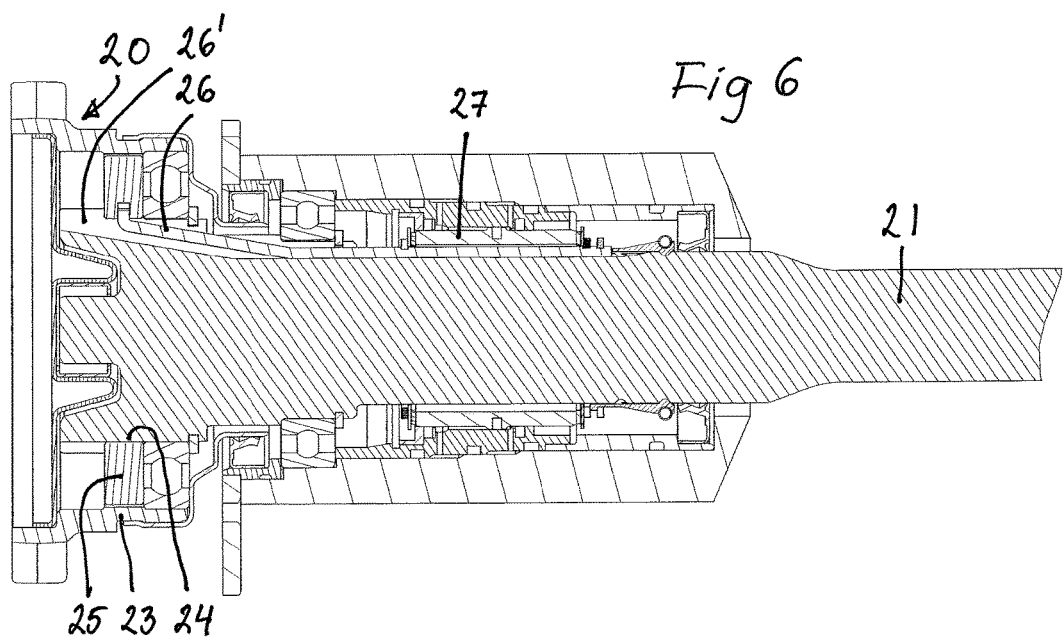
Figure 8:
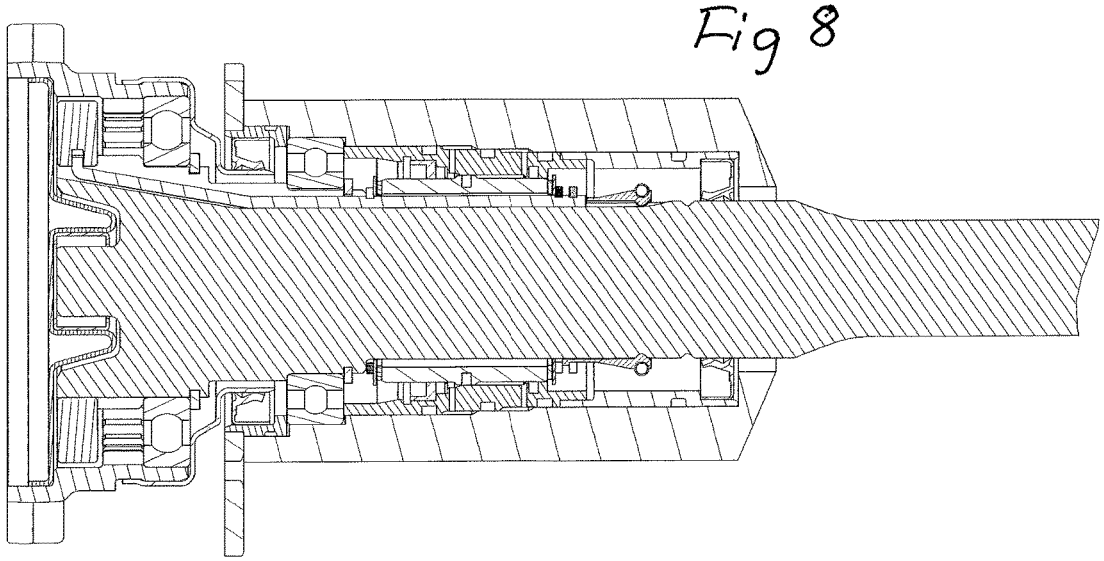

The movement of the clutch ring 25 into and out of engagement with the two rings 23, 24 is accomplished—as is illustrated in FIGS. 6 and 8—by means of longitudinal operating strips 26. As illustrated in FIG. 4, the number of strips 26 may be three. Each strip 26 is at one end connected to the clutch ring 25 and at its other end to a piston 27 of a clutch actuator and is arranged in an axial groove 26' in the axle 21.

Figure 5:
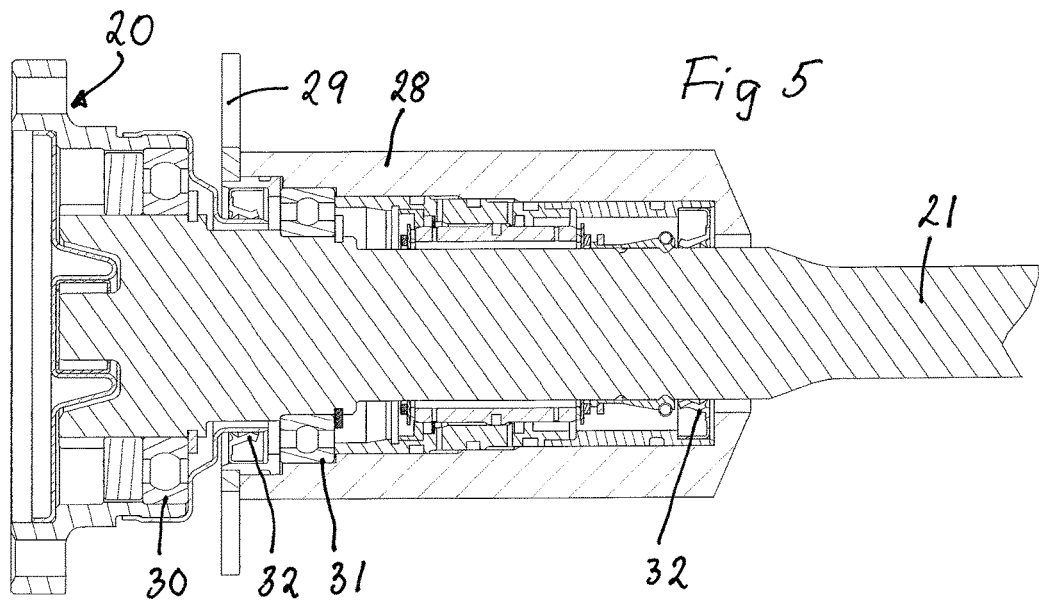
FIGS. 5 and 6 are two different longitudinal sections through the clutch (with the clutch actuator) in connect mode.

Referring especially to FIG. 5, the clutch actuator is contained in a housing 28 and can be connected to a fixed part of the vehicle by means of a mounting flange 29 so as to be non-rotatable. Bearings 30, 31 may be provided between the flange arrangement 20 and the axle 21 and between the axle 21 and the clutch actuator housing 28, respectively. Sealings 32 may be provided between the axle 21 and the clutch actuator housing 28.

FIGS. 5 and 6 show the clutch in the connect mode. The clutch ring 25 is in a right hand position in engagement with the outer ring 23 and the inner ring 24. The piston 27 connected thereto by means of the operating strips 26 is also in its right hand position.

Figure 7:
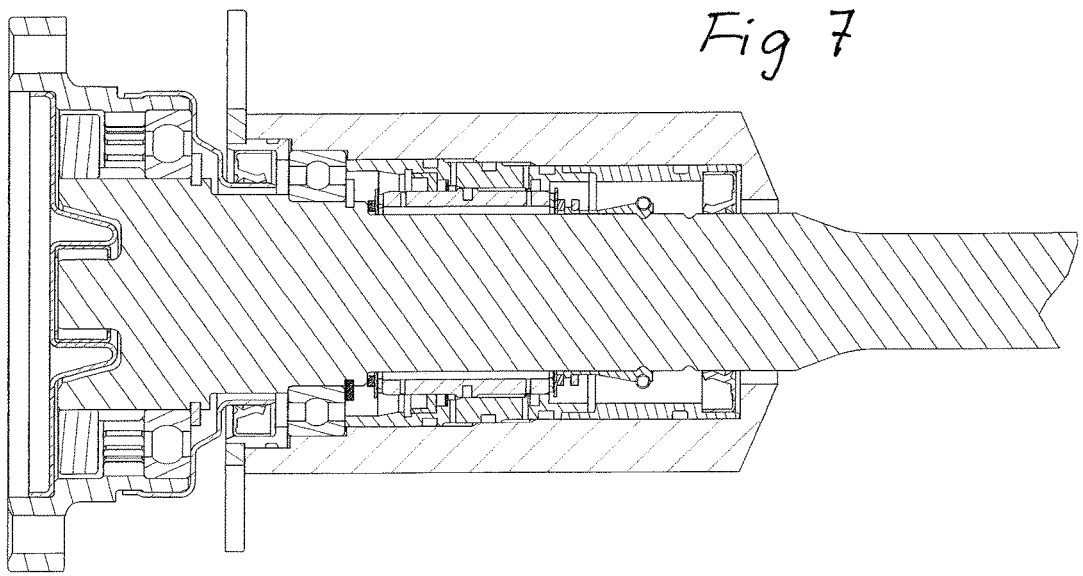
FIGS. 7 and 8 are two corresponding, different longitudinal sections through the clutch (with the clutch actuator) in disconnect mode.

FIGS. 7 and 8 show the clutch in the disconnect mode. The clutch ring 25 is in a left hand position out of engagement with the two rings 23, 24. The piston 27 is also in its left hand position.

Figure 9:
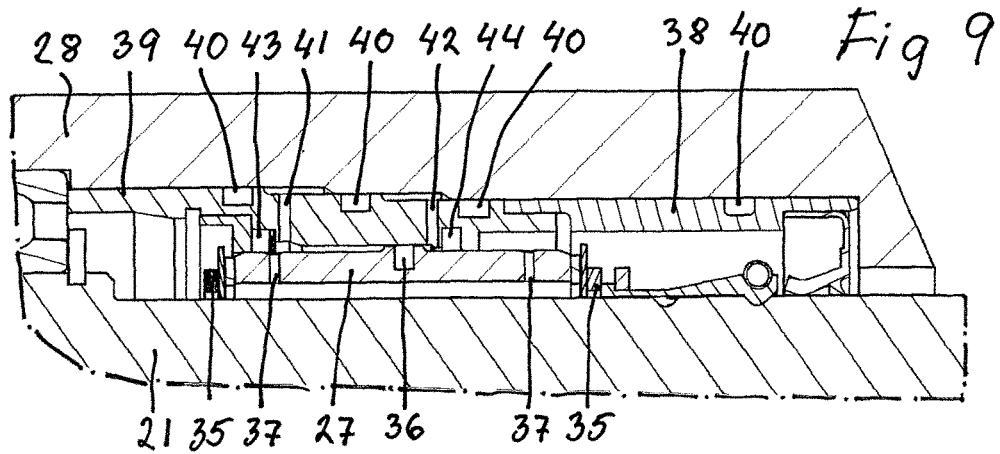
FIGS. 9 and 10 are enlargements of important portions of FIGS. 5 and 7, respectively.
Figure 10:
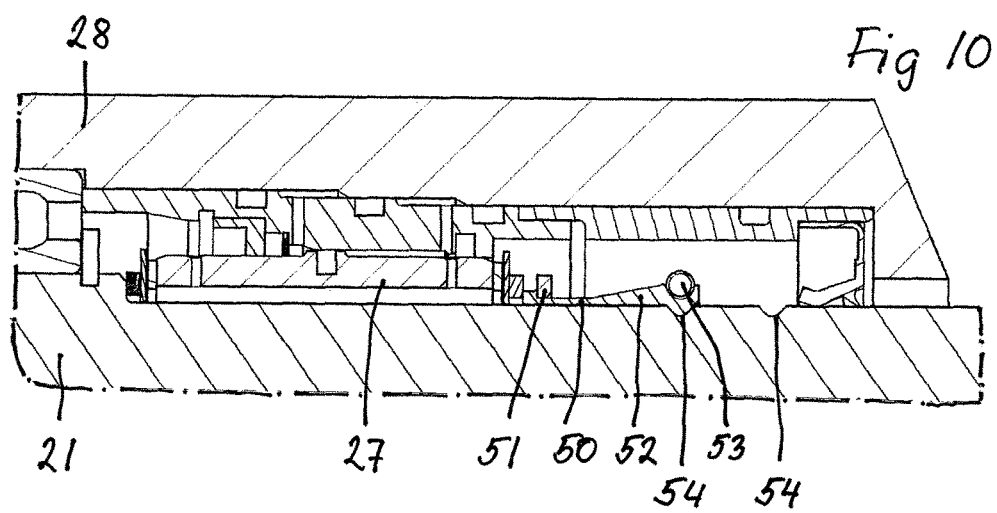

The construction of the clutch actuator will now be described with reference to FIGS. 9 and 10. Shown here are the axle 21, the clutch actuator piston 27, and the clutch actuator housing 28. FIG. 9 illustrates the connect mode and FIG. 10 the disconnect mode.

The tubular piston 27 is attached to the operating strips 26 (which are not visible in FIGS. 9 and 10) by means of spring rings 35. It is provided with a central sealing ring 36 and at either sides thereof overflow holes 37 for a purpose to be described.

A support sleeve 38 and a cylinder sleeve 39 are arranged in the housing 28, sealed in relation thereto by sealings 40. The cylinder sleeve 39 is provided with two inlet ports 41 and 42 for inlet of hydraulic oil for actuating the piston 27 into the connect mode shown in FIG. 9 or into the disconnect mode shown in FIG. 10. The piston sealing 36 is always between the two inlet ports 41, 42 in the reciprocating movement of the piston 27.

The cylinder sleeve 39 is outside of each inlet port 41, 42 provided with an internal sealing 43, 44 in engagement with the piston 27. The diameter of the piston 27 is somewhat decreased at either side of the piston sealing 27 for creating an active piston area for the supplied hydraulic pressure to act on and thus a pressurized working compartment.

Referring to FIG. 9, the piston 27 moves to the right under the pressure supplied through the inlet port 41 in order to reach the shown connect mode. During this movement the left overflow hole 37 will not be in communication with the working compartment, until it has passed the sealing 43, when the piston has reached its shown end position with the clutch connected. When the overflow hole 37, which leads to the housing of the actuator and hereby indirectly to the oil reservoir, gets in communication with the working compartment, the pressure in the latter will drop. The decreased pressure level leads to a decreased current level to the motor 3, providing a signal or indication that the connect mode has been properly reached and that the dog clutch has not been blocked in a teeth-to-teeth situation.

A similar reasoning applies to the disconnect mode and the sealing 44 together with the right hand overflow hole 37.

Figure 11:
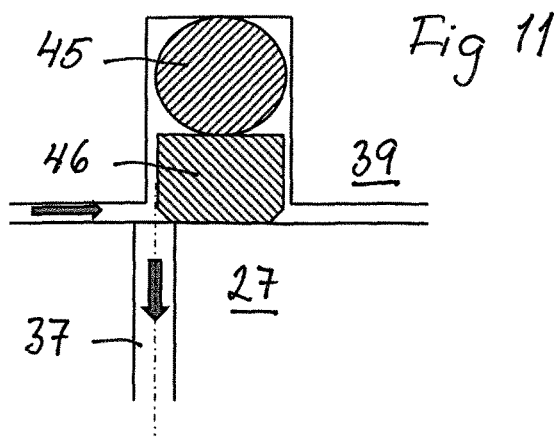
FIG. 11 is a sectional, schematic illustration of a piston sealing construction in the clutch.

The construction of the piston sealings 36, 43 and 44 is illustrated in FIG. 11. Shown here is specifically the right piston sealing 44 in the position of FIG. 10 in order to illustrate the cooperation with the right overflow hole 37. The piston sealing arranged in a circumferential groove in the cylinder sleeve 39 may comprise an O-ring 45 and a packing ring 46 of filled PTFE. When used in sealing constructions, PTFE is often provided with a filler material in order to improve its mechanical strength, stability, and wear resistance. The packing ring 46 may as shown have a flat surface in contact with the piston 27 and have beveled corners. Also the overflow hole 37 may for protective reasons be beveled or rounded at its top opening.

Referring again to FIG. 10, a positioning device 50 is attached to the piston 27 by means of a looking ring 51. To the left in the drawing the positioning device 50 may be sleeve shaped but towards the right be longitudinally slotted or separated into fingers 52 resiliently biased inwards by means of a spring ring 53. The fingers 52 are internally provided with knobs for interaction with circumferential grooves 54 in the axle 21, the left one for keeping the piston 27 in the position for connect mode and the right one for disconnect mode. Also, the interaction between the knobs and the respective groove 54 will assist in moving the piston 27 the last millimeter to its end position, when the respective overflow hole 37 opens.

Modifications are possible within the scope of the appended claims.

The invention claimed is:

1. A hydraulic system with a dog clutch, wherein
a hydraulically operated dog clutch actuator is arranged to alternatively bring the dog clutch into a connect mode or a disconnect mode,
the clutch actuator has a piston reciprocally movable under hydraulic pressure between two end positions, corresponding to the two clutch modes,
pressurized hydraulic oil is supplied to the clutch actuator by a hydraulic power system comprising a pump driven by an electric motor,
and wherein means are provided in the clutch actuator to decrease the hydraulic pressure acting on the piston at the approaching by the piston of either of the end positions, so that a hydraulic signal is transmitted back to the hydraulic power system.

2. A hydraulic system according to claim 1, wherein the piston together with a cylinder sleeve in the clutch actuator forms two working compartments each with an inlet port and wherein the means to decrease the hydraulic pressure acting on the piston at the approaching by the piston of either of the end positions comprises two overflow holes provided in the piston each being arranged to get in contact with one of the working compartments, when the piston is in or close to one of the end positions.

3. A hydraulic system according to claim 2, further comprising an axle extending through the dog clutch, and wherein the clutch actuator is arranged coaxially around the axle with the piston surrounding the axle.

4. A hydraulic system according to claim 3, wherein the working compartments are formed by the piston, the cylinder, a central sealing on the piston and two internal sealings in the cylinder sleeve, the latter sealings being positioned close to and axially outside of the inlet ports.

5. A hydraulic system according to claim 4, wherein the central sealing and the internal sealings each comprise an O-ring and a packing ring of filled PTFE.

6. A hydraulic system according to claim 3, wherein the piston is connected to a clutch ring of the dog clutch by means of longitudinal operating strips in axial grooves in the axle.

7. A hydraulic system according to claim 3, wherein a resilient positioning device is attached to the piston and has resilient means for positioning engagement with either of two circumferential grooves in the axle.

* * * * *